United States Patent
Zhang (10) Patent No.: US 12,380,721 B2
(45) Date of Patent: Aug. 5, 2025

(54) HANDWRITING RECOGNITION METHOD AND APPARATUS, AND ELECTRONIC DEVICE AND STORAGE MEDIUM

(71) Applicant: BOE Technology Group Co., Ltd., Beijing (CN)

(72) Inventor: Huanhuan Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 345 days.

(21) Appl. No.: 17/921,241

(22) PCT Filed: May 27, 2020

(86) PCT No.: PCT/CN2020/092639
§ 371 (c)(1),
(2) Date: Oct. 25, 2022

(87) PCT Pub. No.: WO2021/237517
PCT Pub. Date: Dec. 2, 2021

(65) Prior Publication Data
US 2023/0245483 A1 Aug. 3, 2023

(51) Int. Cl.
*G06V 30/00* (2022.01)
*G06V 10/82* (2022.01)
*G06V 30/182* (2022.01)
*G06V 30/19* (2022.01)
*G06V 30/194* (2022.01)
*G06V 30/262* (2022.01)

(52) U.S. Cl.
CPC ............ *G06V 30/194* (2022.01); *G06V 10/82* (2022.01); *G06V 30/1831* (2022.01); *G06V 30/1916* (2022.01); *G06V 30/274* (2022.01)

(58) Field of Classification Search
CPC .. G06V 30/194; G06V 10/82; G06V 30/1831; G06V 30/1916; G06V 30/274; G06V 30/10; G06V 30/18057; G06V 30/19173
See application file for complete search history.

(56) References Cited

U.S. PATENT DOCUMENTS

| 10,719,701 B2 * | 7/2020 | Salameh ................ G06V 10/30 |
| 2017/0289337 A1 * | 10/2017 | Wang ................ H04M 1/72436 |
| 2020/0184287 A1 * | 6/2020 | Meena ............... G06V 30/2504 |

FOREIGN PATENT DOCUMENTS

| CN | 106599941 A | 4/2017 |
| CN | 107133647 A | 9/2017 |

(Continued)

OTHER PUBLICATIONS

Chowdhury et al an efficient end-to-end neural model for handwritten text recognition arXiv1807.07965v2 (Year: 2018).*

(Continued)

*Primary Examiner* — Xiao Liu
(74) *Attorney, Agent, or Firm* — WHDA, LLP (57) ABSTRACT

A handwriting recognition method and apparatus, and an electronic device and a storage medium are provided. The method includes: acquiring a text image containing handwritten text; inputting the text image into a convolutional neural network, and extracting a CNN feature and a HOG feature of the text image; and extracting the handwritten text in text image according to the CNN feature and the HOG feature.

10 Claims, 5 Drawing Sheets

(56) References Cited

FOREIGN PATENT DOCUMENTS

| | | | |
|---|---|---|---|
| CN | 107688784 A | * | 2/2018 |
| CN | 107967497 A | | 4/2018 |
| CN | 108108349 A | | 6/2018 |
| CN | 108229397 A | | 6/2018 |
| CN | 109034281 A | | 12/2018 |
| CN | 110738090 A | | 1/2020 |

OTHER PUBLICATIONS

International Search Report dated Feb. 20, 2021, issued in counterpart International application No. PCT/CN2020/092639, with English translation. (15 pages).

Office Action dated Dec. 27, 2024, issued in counterpart CN Application No. 202080000835.0, with English translation. (21 pages).

* cited by examiner

HANDWRITING RECOGNITION METHOD AND APPARATUS, AND ELECTRONIC DEVICE AND STORAGE MEDIUM

TECHNICAL FIELD

The present disclosure relates to the technical field of image processing, in particular to a handwriting recognition method and apparatus, an electronic device and a storage medium.

BACKGROUND

In off-line handwriting recognition, a handwritten text image is usually generated by scanning handwritten text with a scanner/photographing the handwritten text with a camera. A terminal calls the off-line handwritten text recognition service, and sends the handwritten text image to a server, which recognizes the handwritten text in the handwritten text image and returns a text recognition result. The terminal can apply the text recognition result to different services, such as text editing service.

Accuracy of the handwriting recognition result is an important factor that affects the handwriting recognition service. Therefore, it is necessary to continuously improve the accuracy of the handwriting recognition.

SUMMARY

The present disclosure aims at solving one of the technical problems in related art at least to a certain extent.

Therefore, the present disclosure is directed to provide a handwriting recognition method and apparatus, an electronic device and a storage medium.

In an embodiment of a first aspect of the present disclosure, a handwriting recognition method is provided, including:
 acquiring a text image containing handwritten text;
 inputting the text image to a convolutional neural network, and extracting a CNN feature of the text image;
 dividing the text image into a plurality of text subimages according to a preset size, and extracting directional gradient features of the plurality of text subimages;
 acquiring a HOG feature of the text image according to the directional gradient features; and
 extracting the handwritten text from the text image according to the CNN feature and the HOG feature.

In an embodiment of a second aspect of the present disclosure, a handwriting recognition apparatus is provided, including:
 an acquisition module configured to acquire a text image containing handwritten text;
 a first extraction module configured to input the text image to a convolutional neural network, and to extract a CNN feature of the text image;
 a second extraction module configured to divide the text image into a plurality of text subimages according to a preset size, and to extract the directional gradient features of the plurality of text subimages;
 a generating module configured to acquire a HOG feature of the text image according to the directional gradient features; and
 a recognition module configured to extract the handwritten text from the text image according to the CNN feature and the HOG feature.

In an embodiment of a third aspect of the present disclosure, an electronic device is provided, which includes a memory and a processor. The processor executes a program corresponding to an executable program code by reading the executable program code stored in the memory, so as to implement the handwriting recognition method according to the embodiment of the first aspect.

In an embodiment of the fourth aspect of the present disclosure, a non-temporary computer-readable storage medium is provided, and when instructions in the storage medium are executed by a processor of the electronic device, an electronic device is caused to execute a handwriting recognition method, and the method includes the handwriting recognition method according to the embodiment of the first aspect of the present disclosure.

In an embodiment of the fifth aspect of the present disclosure, a computer program product is provided, and when instructions in the computer program product are executed by a processor, the handwriting recognition method according to the embodiment of the first aspect is implemented.

Additional aspects and advantages of the present disclosure will be set forth in part in following description, and in part will be obvious from the following description, or may be learned by practice of the present disclosure.

BRIEF DESCRIPTION OF THE DRAWINGS

The above and/or additional aspects and advantages of the present disclosure will become apparent and easy to be understood from following description of embodiments taken in conjunction with the accompanying drawings, in which.

DETAILED DESCRIPTION OF THE EMBODIMENTS

Embodiments of the present disclosure will be described in detail below, examples of which are shown in the accompanying drawings, in which same or similar reference numerals refer to same or similar elements or elements with same or similar functions throughout. The embodiments described below with reference to the drawings are exemplary and are only intended to explain the present disclosure, but should not be construed as limiting the present disclosure. On the contrary, all of changes, modifications and equivalents that fall within spirit and connotation of the appended claims are included in the embodiments of the present disclosure.

Figure 1:
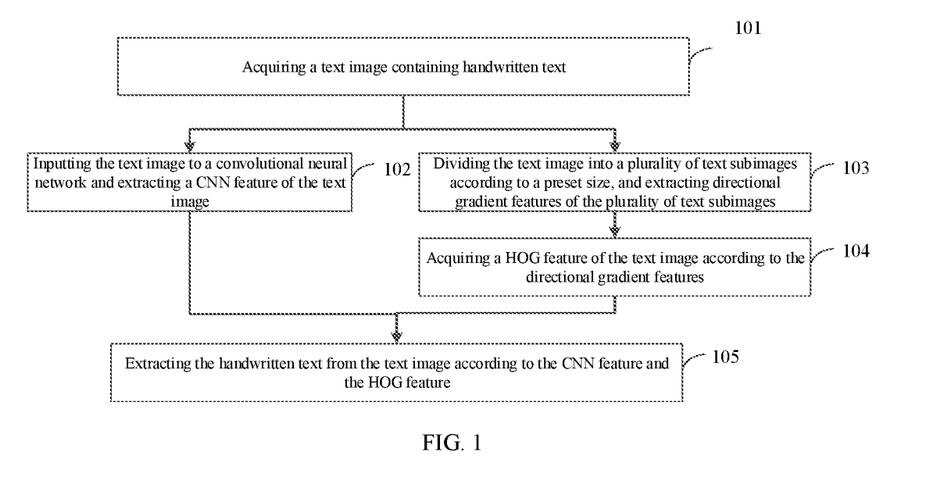
FIG. 1 is a flow chart of a handwriting recognition method according to an embodiment of the present disclosure.

FIG. 1 is a flow chart of a handwriting recognition method according to an embodiment of the present disclosure, and as shown in FIG. 1, the method includes steps 101 to 105.

Step 101, acquiring a text image containing handwritten text.

The handwriting recognition method according to this embodiment can be applied to off-line handwriting recognition.

In this embodiment, the handwriting recognition method being configured in electronic device is taken as an example.

It should be noted that an executing subject of the embodiment of the present disclosure may be, for example, a Central Processing Unit (CPU) in a server or the electronic device in hardware, and may be, for example, related background service in a server or the electronic device in software, which is not limited in this embodiment.

In this embodiment, when handwriting recognition is performed, a text image containing handwritten text can be obtained. The handwritten text includes, but is not limited to handwritten words, characters or the like.

Figure 2:
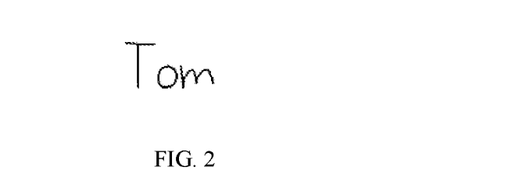
FIG. 2 is a schematic diagram of a text image according to an embodiment of the present disclosure.

The text image can be a text line image or a text column image. As an example, an image containing handwritten text is obtained, and a text line image containing the handwritten text is obtained by detecting a text line object of the image. FIG. 2 is an example of a text image containing the handwritten text.

In an embodiment of the present disclosure, sizes of the text images may be different, so after the text images containing the handwritten text are obtained, a preset image size can also be obtained, and a sizes of the text image can be adjusted to the preset image size.

As an example, a height H and a width W are set in advance, and after the text image is obtained, a height of the text image is adjusted to H and a width of the text image is adjusted to W by a resize function of an open source computer vision library opencv. The preset image size may be set as required, for example, the height may be 256 and the width may be 2048. Therefore, size normalization of the text image may be realized, sizes of the text images may be kept consistent, so as to further extract features from the text image.

Optionally, before normalizing the size of the text image, the text image may also be denoised to reduce influence of noise on image recognition.

Step 102, inputting the text image to a convolutional neural network, and extracting a CNN feature of the text image.

In this embodiment, the text image is input to a preset convolutional neural network, and a plurality of convolutional neural network (CNN) feature images are output, and the plurality of CNN feature images are configured as the CNN feature of the text image.

Optionally, a height of each of the CNN feature images is 1/N of a height of the text image, and a width of each of the CNN feature images is 1/M of a width of the text image. For example, the height and width of each of the CNN feature images both are ⅛ of those of the text image. Different proportional relationships between the CNN feature images and the text image may be realized according to different convolutional neural network architectures.

Step 103, dividing the text image into a plurality of text subimages according to a preset size, and extracting directional gradient features of the plurality of text subimages.

The preset size may be set as required, for example, the text image may be divided into a plurality of text subimages (cells), each of the cells with a size of 4×4 pixels.

As a possible embodiment, the text image is grayed, and gradient information of each of pixels in the grayed text image is calculated, and the gradient information may include direction information and size information. The text image is divided into a plurality of cells according to the preset size, a gray gradient histogram of each of the cells is calculated according to the gradient information of each of the pixels, and the gray gradient histogram is configured as the directional gradient feature.

Step 104, acquiring a HOG feature of the text image according to the directional gradient features.

In this embodiment, after extracting the directional gradient features of the plurality of text subimages, the Histogram of Oriented Gradient (HOG) feature of the text image may be obtained according to all of the directional gradient features in series.

In an embodiment of the present disclosure, when the HOG feature of the text image is obtained, a plurality of subimage blocks may be generated according to the plurality of text subimages. Each of the plurality of subimage blocks contains a preset quantity of text subimages. Further, the directional gradient features of all of the text subimages in each of the subimage blocks are connected in series to obtain a HOG subfeature corresponding to each of the subimage blocks, and the HOG feature is obtained according to HOG subfeatures of the plurality of subimage blocks.

The preset quantity may be set as required, for example, every 2×2 cell forms one block, and optionally, all of the blocks do not overlap in space. For a block, gray gradient histograms of all of cells in the block are connected in series to generate the HOG subfeature of the block, and HOG feature images are generated according to HOG subfeatures of all of the blocks.

In this embodiment, the CNN feature image and the HOG feature image have a same size.

Step 105, extracting the handwritten text from the text image according to the CNN feature and the HOG feature.

In this embodiment, a recognition model is trained in advance, and the CNN feature and the HOG feature of the text image are configured as an input of the recognition model, and the handwritten text in the text image is configured as an output of the recognition model. Optionally, the recognition model may be implemented based on a transformer network.

As a possible embodiment, the recognition model is trained as follows. A sample image containing the handwritten text is obtained, and the sample image is marked with a marked result of the handwritten text. The CNN feature and HOG feature of the sample image are extracted, and a prediction result of the handwritten text in the sample image is obtained by the recognition model according to the CNN feature and HOG feature of the sample image. Parameters of the recognition model are adjusted according to difference between the marked result and the prediction result, so as to train the recognition model. Optionally, connectionist temporal classification (CTC) loss can be adopted in training the recognition model.

According to the handwriting recognition method of the embodiment of the present disclosure, the text image containing handwritten text is obtained and then the text image is input to the convolutional neural network to extract the CNN feature of the text image; and the text image is divided into a plurality of text subimages according to the preset size, the directional gradient features of the plurality of text subimages are extracted, and the HOG feature of the text image is obtained according to all of the directional gradient features. Further, the handwritten text is extracted from the text image according to the CNN feature and the HOG feature. Therefore, the CNN feature and the HOG feature are combined to realize handwriting recognition, and the gradient information is involved in the handwriting recognition, which improves the accuracy of the handwriting recognition.

Based on the above embodiments, Examples of extracting the CNN feature and the HOG feature of the text image will be illustrated in the following.

Figure 3:
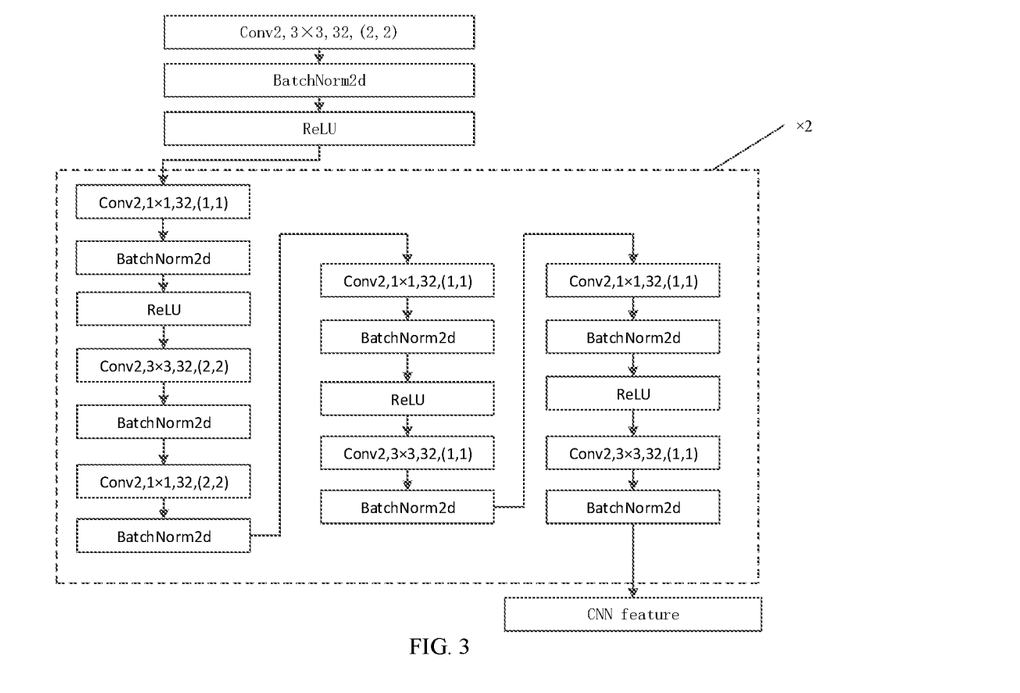
FIG. 3 is a schematic diagram of extraction of a CNN feature according to an embodiment of the present disclosure.

FIG. 3 is a schematic diagram of extraction of CNN features according to an embodiment of the present disclosure.

As shown in FIG. 3, Conv2 represents two-dimensional convolution, 3×3 and 1×1 represent convolution kernels, 32 represents a quantity of feature subgraphs, and (1,1) and (2,2) represent steps, that is, steps that convolution kernels move in dimensions of width and height. In FIG. 3, a quantity of dashed boxes is 2. The text image after size normalization is processed in a way shown in FIG. 3 so as to obtain the CNN feature of the text image.

In this example, a height and a width of each of the CNN feature images are ⅛ of those of the text image.

Figure 4:
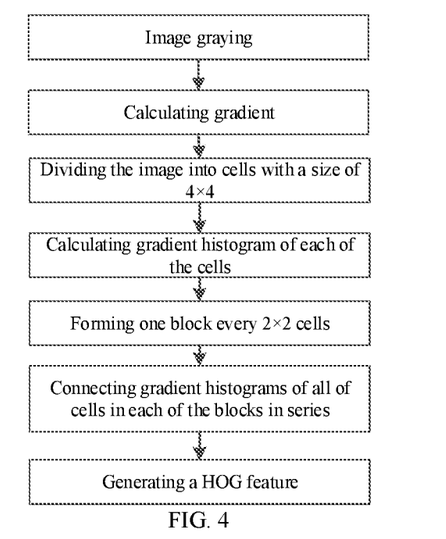
FIG. 4 is a schematic diagram of extraction of a HOG feature according to an embodiment of the present disclosure.

FIG. 4 is a schematic diagram of extraction of the HOG feature according to an embodiment of the present disclosure.

As shown in FIG. 4, the text image after size normalization is grayed, and the gradient information including size and direction is calculated according to the grayed text image. A size of each of the cells is 4×4 pixels, and one block is formed by every 2×2 cells. A gray gradient histogram of each of the cells is calculated, and gray gradient histograms of all of the cells in one block are connected in series to generate the HOG subfeature of the block, and HOG feature images of the text image are generated according to HOG subfeatures of all of the blocks.

In this example, the CNN feature image and the HOG feature image have the same size.

It should be noted that the above embodiment is only an example. For example, the height and width of each of the CNN feature images may be ¼ of those of the text image, the size of the cell may be set to 2×2, and a size of the block is set to 4×4, which is not limited in the present disclosure.

Based on the embodiment described above, extraction of the handwritten text from the text image according to the CNN feature and the HOG feature will be described below in combination with the recognition model.

Figure 5:
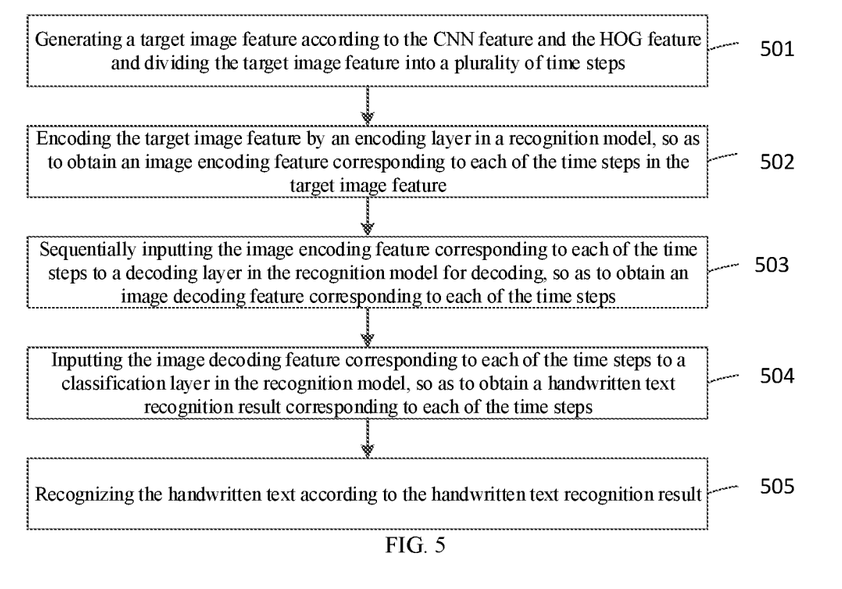
FIG. 5 is a flow chart of another handwriting recognition method according to an embodiment of the present disclosure.

FIG. 5 is a flow chart of another handwriting recognition method according to an embodiment of the present disclosure, and as shown in FIG. 5, the method includes steps 501 to 505.

Step 501, generating a target image feature according to the CNN feature and the HOG feature, and dividing the target image feature into a plurality of time steps.

In this embodiment, after extracting the CNN feature and the HOG feature of the text image, the target image feature is constructed according to the CNN feature and the HOG feature. A channel number of the target image feature is a number of the CNN feature images plus a number of the HOG feature images, and optionally, a size of the target image feature is the same as that of each of the CNN feature images.

After the target image feature is generated, the target image feature is divided into a plurality of time steps. As an example, for a text line image, each column of the target image feature is taken as a time step so as to divide the target image feature into the plurality of time steps. As an example, for a text column image, each line of the target image feature is taken as a time step so as to divide the target image feature into the plurality of time steps.

Optionally, for each of the time steps in the target image feature, it is a one-dimensional vector formed by connecting channel features of respective lines/columns, and feature vector sequences are formed according to the plurality of time steps. The feature vector sequences are arranged in a preset order, and one position coding vector can be added for respective time steps to indicate the order.

Step 502, encoding the target image feature by an encoding layer in the recognition model, so as to respectively obtain an image encoding feature corresponding to each of the time steps in the target image feature.

In this embodiment, the recognition model is implemented based on a transformer network. The recognition model includes an encoding layer and a decoding layer. The encoding layer is composed of a plurality of encoder networks connected in sequence. Optionally, structures of the plurality of encoder networks are the same, and a number of encoder networks is 6, for example.

Figure 6:
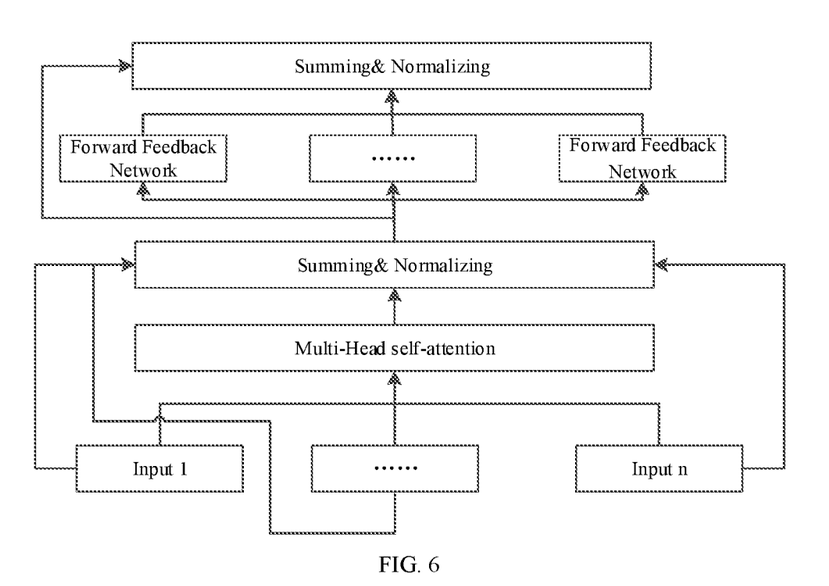
FIG. 6 is a schematic diagram of an encoder network according to an embodiment of the present disclosure.

As an example, as shown in FIG. 6, the encoder network includes a Multi-Head self-attention neural network and a forward feedback network. Each forward feedback network includes a linear activation function and a ReLU activation function. The Multi-head-self-attention neural network is connected in parallel by multiple self-attention networks, inputs of which are preprocessed feature vector sequences. Outputs of the multiple self-attention networks are connected and multiplied by a fusion weight matrix, and results obtained are configured as an input of the feedforward neural network. The Multi-head-self-attention neural network expands the recognition model's ability to focus on different positions, and gives representation subspace of an attention layer.

In this example, the target feature image is input to the multi-head self-attention neural network of which output results are summed and normalized, and then input to the forward feedback network. After summing and normalizing an output of the forward feedback network, the image encoding feature corresponding to each of the time steps is obtained.

Step 503, sequentially inputting the image encoding feature corresponding to each of the time steps to the decoding layer in the recognition model for decoding, so as to obtain an image decoding feature corresponding to each of the time steps.

In this embodiment, the decoding layer is composed of a plurality of decoder networks connected in sequence. Optionally, structures of the decoder networks are the same, and a number of decoder networks is 6, for example. The image encoding feature corresponding to each of the time steps is sequentially input to the decoding layer in the recognition model for decoding, so as to obtain an image decoding feature corresponding to each of the time steps.

Figure 7:
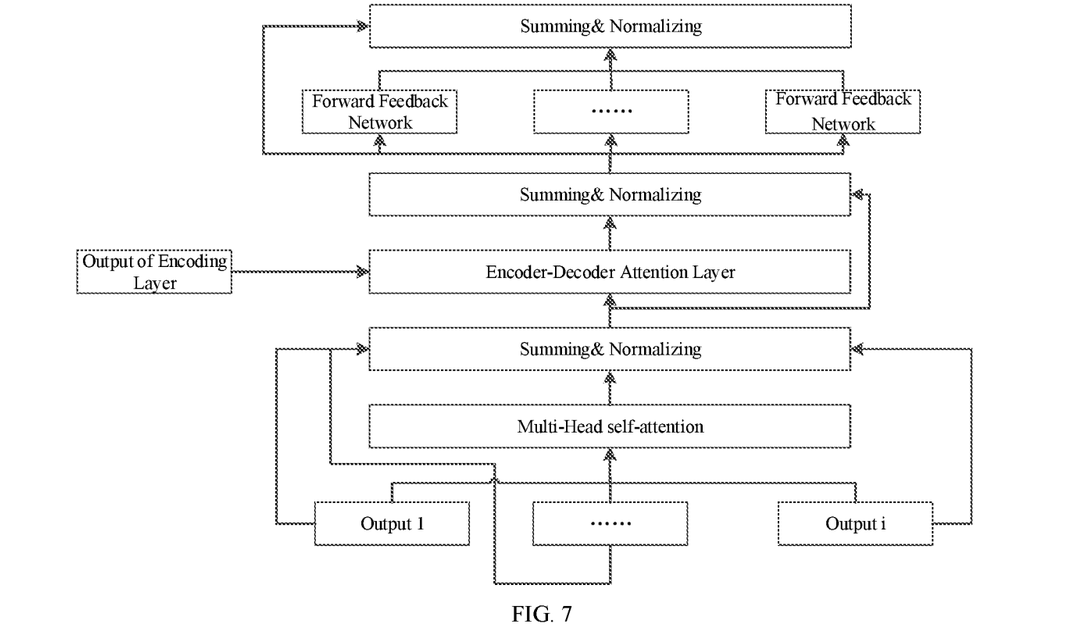
FIG. 7 is a schematic diagram of a decoder network according to an embodiment of the present disclosure.

As an example, the decoder network is shown in FIG. 7. The decoder network includes a multi-headed self-attention neural network, an Encoder-Decoder Attention layer, and a feedforward neural network. Structures of the multi-head self-attention neural network and the feedforward neural network is the same as those of the encoder network. In the decoder network, an input of the multi-headed self-attention neural network is: a first vector sequence formed by converting the recognized text sequence into a continuous vector (embedding), and a second vector sequence formed by connecting corresponding position coding vector sequences. The Encoder-Decoder Attention layer is a self-attention network, in which a query matrix is created by the multi-head self-attention neural network, and a key/value matrix is obtained from an output of the encoding layer.

In this example, the second vector sequence described above is input to the multi-head self-attention neural network, and then an output result is summed, normalized, and input to the Encoder-Decoder Attention layer together with the image encoding feature currently output by the coding layer. An output of the Encoder-Decoder Attention layer is summed, normalized, and input to the forward feedback network. An output of the forward feedback network is summed, normalized, so as to obtain a current image decoding feature.

As a possible embodiment, sequentially inputting the image encoding feature corresponding to each of the time steps to the decoding layer in the recognition model for decoding, so as to obtain the image decoding feature corresponding to each of the time steps includes: determining whether a currently input image encoding feature is a first image encoding feature; if the currently input image encoding feature is not the first image encoding feature, acquiring an image decoding feature corresponding to a previously input image encoding feature; generating an image decoding feature corresponding to the currently input image encoding feature according to the currently input image encoding feature and the image decoding feature corresponding to the previously input image encoding feature; and if the currently input image encoding feature is the first image encoding feature, a corresponding image decoding feature is obtained according to the currently input image encoding feature. Optionally, if the currently input image encoding feature is the first image encoding feature, the image decoding feature corresponding to the currently input image encoding feature is generated according to a preset value and the image encoding feature.

Step 504, inputting the image decoding feature corresponding to each of the time steps to a classification layer in the recognition model, so as to respectively obtain a handwritten text recognition result corresponding to each of the time steps.

In this embodiment, the recognition model also includes the classification layer.

As an example, the image decoding feature corresponding to each of the time steps is sequentially input to the classification layer so as to obtain the handwritten text recognition result, such as an output vector reflecting probability of each character.

The classification layer includes a linear layer and a Softmax layer, and the linear layer is a fully connected neural network.

Above steps are performed for each of the time steps so as to obtain the handwritten text recognition result corresponding to each of the time steps.

Step 505, recognizing the handwritten text according to the handwritten text recognition result.

In this embodiment, the handwritten text recognition result corresponding to each of the time steps is normalized to obtain the handwritten text of the text image. For example, for the text image shown in FIG. 2, the recognized handwritten text is "Tom".

Figure 8:
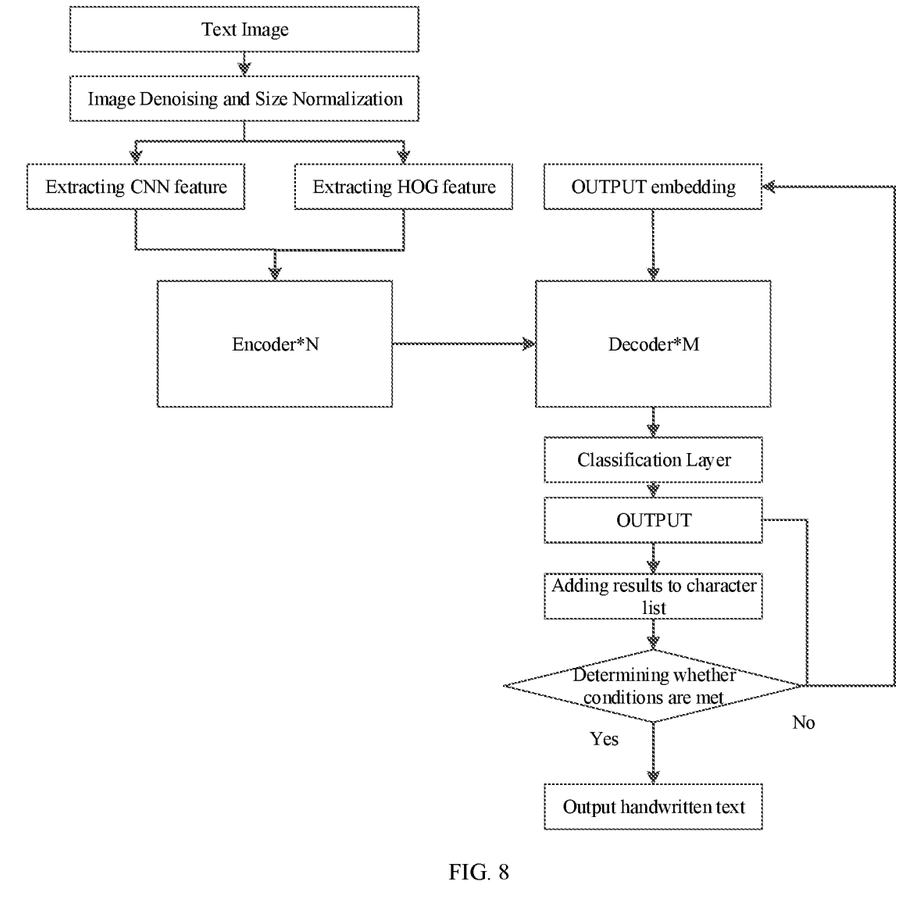
FIG. 8 is a flow chart of another handwriting recognition method according to an embodiment of the present disclosure.

For example, referring to FIG. 8, the text image containing handwritten text is obtained, image denoising and size normalization are performed on the text image, and then, the CNN feature and the HOG feature of the text image are extracted, and the CNN feature and the HOG feature of the text image are processed through an encoder network and a decoder network, so as to recognize the handwritten text in the text image.

According to the handwriting recognition method of this embodiment, the encoding layer and the decoding layer extract the handwritten text from text image according to the CNN feature and the HOG feature. Therefore, sequence-to-sequence handwriting recognition based on an attention mechanism can be realized, and the CNN feature and the HOG feature are combined to realize handwriting recognition, and the gradient information is involved in the handwriting recognition, which improves accuracy of the handwriting recognition.

Figure 9:
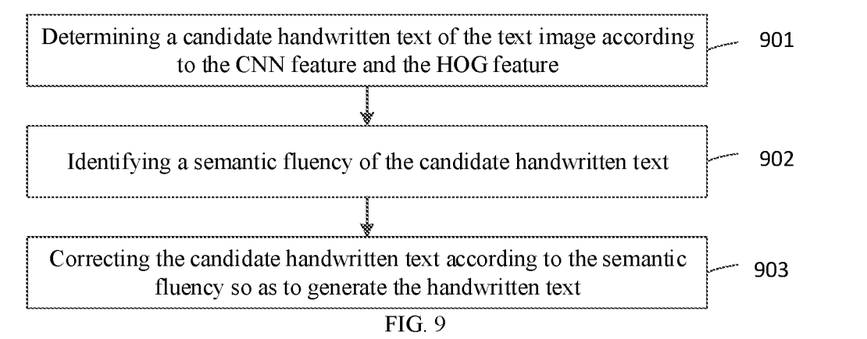
FIG. 9 is a flow chart of yet another handwriting recognition method according to an embodiment of the present disclosure.

FIG. 9 is a flow chart of another handwriting recognition method according to an embodiment of the present disclosure, and as shown in FIG. 9, the method includes steps 901 to 903.

In step 901, determining a candidate handwritten text of the text image according to the CNN feature and the HOG feature.

In this embodiment, for the text image containing the handwritten text, the CNN feature and the HOG feature of the text image are extracted, and the candidate handwritten text is identified according to the CNN feature and the HOG feature of the text image.

In step 902, identifying a semantic fluency of the candidate handwritten text.

In this embodiment, an input of a semantic fluency model is a word or sentence, and an output of the semantic fluency model is the semantic fluency, which is a numerical value, such as 0 to positive infinity. After the candidate handwritten text in the text image is identified according to the CNN feature and the HOG feature, the candidate handwritten text is input into the semantic fluency model to obtain a corresponding semantic fluency.

In step 903, correcting the candidate handwritten text according to the semantic fluency so as to generate the handwritten text.

In this embodiment, it is determined whether the semantic fluency is greater than a preset threshold.

As an example, if the semantic fluency is less than or equal to the preset threshold, the candidate handwritten text is error corrected to generate the handwritten text according to the error-corrected candidate handwritten text. Optionally, an error sentences and a corresponding correct sentence can be used as training samples to train the error correction model from the error sentence to the correct sentence. Furthermore, if the semantic fluency of the candidate handwritten text is less than or equal to the preset threshold, the candidate handwritten texts may be processed according to a pre-trained error correction model, and an output result will be configured as the recognized handwritten text.

As another example, if the semantic fluency is greater than the preset threshold, the current candidate handwritten text is taken as the recognized handwritten text.

According to the handwriting recognition method of this embodiment, the candidate handwritten text of the text image is determined according to the CNN feature and the HOG feature, and then, the semantic fluency of the identified candidate handwritten texts is corrected according to the semantic fluency to generate the handwritten text. Therefore, the handwritten recognition result can be corrected according to context semantics, and the accuracy of the recognition result is further improved.

Figure 10:
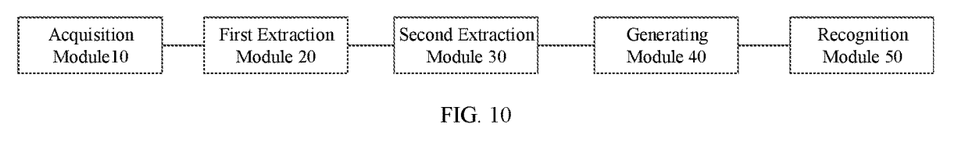
FIG. 10 is a schematic structural diagram of a handwriting recognition apparatus according to an embodiment of the present disclosure.

FIG. 10 is a schematic structural diagram of a handwriting recognition apparatus according to an embodiment of the present disclosure. As shown in FIG. 10, the apparatus includes an acquisition module 10, a first extraction module 20, a second extraction module 30, a generation module 40 and a recognition module 50.

The acquisition module 10 is configured to obtain a text image containing handwritten text.

The first extraction module 20 is configured to input the text image to a convolutional neural network, and to extract a CNN feature of the text image.

The second extraction module 30 is configured to divide the text image into a plurality of text subimages according to a preset size, and to extract the directional gradient features of the plurality of text subimages.

The generating module 40 is configured to obtain a HOG feature of the text image according to the directional gradient features.

The recognition module 50 is configured to extract the handwritten text from the text image according to the CNN feature and the HOG feature.

Optionally, the generating module 40 is specifically configured to generate a plurality of subimage blocks according to the plurality of text subimages, each of the plurality of subimage blocks containing a preset quantity of text subimages; connecting the directional gradient features of all of the text subimages in each of the subimage blocks in series to obtain a HOG subfeature corresponding to each of the subimage blocks, and acquiring the HOG feature according to HOG subfeatures corresponding to the plurality of subimage blocks.

Figure 11:
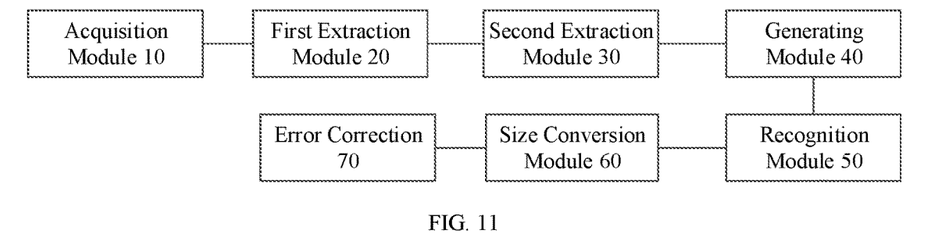
FIG. 11 is a schematic structural diagram of another handwriting recognition apparatus according to an embodiment of the present disclosure.

Optionally, referring to FIG. 11, the apparatus further includes a size conversion module 60, which is configured to obtain a preset image size and adjust a size of the text image to the preset image size.

Optionally, functions of the recognition module 50 specifically include: generating a target image feature according to the CNN feature and the HOG feature and dividing the target image feature into a plurality of time steps; encoding the target image feature so as to respectively obtain an image encoding feature corresponding to each of the time steps in the target image feature; sequentially decoding the image encoding feature corresponding to each of the time steps so as to obtain the image decoding feature corresponding to each of the time steps; classifying the image decoding feature corresponding to each of the time steps, so as to respectively obtain a handwritten text recognition result corresponding to each of the time steps; and identifying the handwritten text according to the handwritten text recognition result.

Optionally, the identification module 50 is specifically configured to: determine whether a currently input image encoding feature is a first image encoding feature; if the currently input image encoding feature is not the first image encoding feature, to obtain an image decoding feature corresponding to a previously input image encoding feature; generate an image decoding feature corresponding to the currently input image encoding feature according to the currently input image encoding feature and the image decoding feature corresponding to the previously input image encoding feature; and if the currently input image encoding feature is the first image encoding feature, to obtain a corresponding image decoding feature according to the currently input image encoding feature.

Optionally, referring to FIG. 11, the apparatus further includes an error correction module 70, which is configured to: determine a candidate handwritten text of the text image according to the CNN feature and the HOG feature; identify semantic fluency of the candidate handwritten text; if the semantic fluency is less than or equal to the preset threshold, correct the candidate handwritten text according to a pre-trained error correction model so as to generate the handwritten text; and if the semantic fluency is greater than the preset threshold, the candidate handwritten text is taken as the handwritten text.

Illustration of the handwriting recognition method in the previous embodiment is also applicable to the handwriting recognition apparatus of this embodiment, which will not be repeatedly described here.

According to the handwriting recognition apparatus of the embodiment of the present disclosure, the text image containing handwritten text is obtained and then the text image is input to the convolutional neural network to extract the CNN feature of the text image; and the text image is divided into a plurality of text subimages according to the preset size, the directional gradient features of the plurality of text subimages are extracted, and the HOG feature of the text image is obtained according to all of the directional gradient features. Further, the handwritten text is extracted from the text image according to the CNN feature and the HOG feature.

Therefore, the CNN feature and the HOG feature are combined to realize handwriting recognition, and the gradient information is involved in the handwriting recognition, which improves accuracy of the handwriting recognition.

In order to implement the above embodiment, an electronic device is provided in an embodiment of the present disclosure, which includes a processor and a memory. The processor executes a program corresponding to an executable program code by reading the executable program code stored in the memory, so as to implement the handwriting recognition method according to any of embodiments described above.

In order to realize the above embodiment, a non-temporary computer readable storage medium with a computer program stored thereon is provided in an embodiment of the present disclosure, the computer program, when executed by a processor, implements the handwriting recognition method according to method embodiments described above.

In order to realize the above embodiments, a computer program product is provided in an embodiment of the present disclosure, and when instructions in the computer program product are executed by a processor, the handwriting recognition method of the method embodiments described above is implemented.

It should be noted that in description of the present disclosure, terms "first" and "second" are only used for descriptive purposes, and cannot be understood as indicating or implying relative importance. In addition, in description of the present disclosure, unless otherwise stated, "a plurality of" means two or more.

Any process or method description in the flow chart or otherwise described herein can be understood as a module, segment or part of code that includes one or more executable instructions for implementing specific logical functions or steps of a process, and scope of the preferred embodiments of the present disclosure includes other implementations, in which functions can be performed out of an order shown or discussed, including in a substantially simultaneous manner or in a reverse order according to functions involved, which should be understood by those skilled in the art to which the embodiments of the present disclosure belong.

It should be understood that various parts of the present disclosure can be implemented in hardware, software, firmware or combination thereof. In the above embodiments, a plurality of steps or methods can be implemented in software or firmware stored in a memory and executed by a suitable instruction execution system. For example, if it is implemented in hardware, as in another embodiment, it can be implemented in any one or combination of following technologies known in the art: a discrete logic circuit with logic gates for realizing logic functions on data signals, an application specific integrated circuit with appropriate combinational logic gates, a programmable gate array (PGA), a field programmable gate array (FPGA), etc.

It can be understood by those of ordinary skilled in the art that all or part of the steps involved in implementing the methods of the above embodiments can be completed by instructing related hardware through a program which can be stored in a computer-readable storage medium. When the program is executed, one or a combination of steps of the method embodiment can be involved.

In addition, respective functional units in respective embodiments of the present disclosure may be integrated in a processing module, may exist physically separately, or two or more of the units may be integrated in a module. The above integrated modules can be implemented in a form of hardware or software functional modules. The integrated unit can be stored in a computer-readable memory if it is implemented in a form of a software function module and sold or used as an independent product.

In the description of this specification, description referring to terms "one embodiment", "some embodiments", "examples", "specific examples" or "some examples" means that specific features, structures, materials or characteristics described in connection with this embodiment or example are included in at least one of embodiments or examples of the present disclosure. In this specification, schematic expressions of above terms do not necessarily refer to a same embodiment or example. Furthermore, the specific features, structures, materials or characteristics described may be combined in any one or more of embodiments or examples in a suitable manner.

Although the embodiments of the present disclosure have been shown and described above, it can be understood that the above embodiments are illustrative and should not be construed as limitations of the present disclosure, and changes, modifications, substitutions and variations to the above embodiments can be made by those skilled in the art within the scope of the present disclosure.

The invention claimed is:

1. A handwriting recognition method, comprising:
acquiring a text image containing handwritten text;
inputting the text image to a convolutional neural network and extracting a Convolutional Neural Network feature of the text image;
dividing the text image into a plurality of text subimages according to a preset size, and extracting directional gradient features of the plurality of text subimages;
acquiring a histogram of oriented gradient feature of the text image according to the directional gradient features; and
extracting the handwritten text from the text image according to the Convolutional Neural Network feature and the histogram of oriented gradient feature;
wherein extracting the handwritten text from the text image according to the Convolutional Neural Network feature and the histogram of oriented gradient feature comprises:
generating a target image feature according to the Convolutional Neural Network feature and the histogram of oriented gradient feature and dividing the target image feature into a plurality of time steps;
encoding the target image feature by an encoding layer in a recognition model, so as to obtain an image encoding feature corresponding to each of the time steps in the target image feature;
sequentially inputting the image encoding feature corresponding to each of the time steps to a decoding layer in the recognition model for decoding, so as to obtain an image decoding feature corresponding to each of the time steps;
inputting the image decoding feature corresponding to each of the time steps to a classification layer in the recognition model, so as to obtain a handwritten text recognition result corresponding to each of the time steps; and
recognizing the handwritten text according to the handwritten text recognition result;
wherein sequentially inputting the image encoding feature corresponding to each of the time steps to the decoding layer in the recognition model for decoding, so as to obtain an image decoding feature corresponding to each of the time steps comprises:
determining whether a currently input image encoding feature is a first image encoding feature;
on the condition that the currently input image encoding feature is not the first image encoding feature, acquiring an image decoding feature corresponding to a previously input image encoding feature;
generating an image decoding feature corresponding to the currently input image encoding feature according to the currently input image encoding feature and the image decoding feature corresponding to the previously input image encoding feature; and
on the condition that the currently input image encoding feature is the first image encoding feature, acquiring a corresponding image decoding feature according to the currently input image encoding feature.

2. The method according to claim 1, wherein acquiring the histogram of oriented gradient feature of the text image according to the directional gradient features comprises:
generating a plurality of subimage blocks according to the plurality of text subimages, wherein each of the plurality of subimage blocks contains a preset quantity of text subimages;
connecting the directional gradient features of all of the text subimages in each of the subimage blocks in series to obtain a histogram of oriented gradient subfeature corresponding to each of the subimage blocks; and
acquiring the histogram of oriented gradient feature according to histogram of oriented gradient subfeatures corresponding to the plurality of subimage blocks.

3. The method according to claim 1, wherein after acquiring the text image containing handwritten text, the method further comprises:
acquiring a preset image size and adjusting a size of the text image to the preset image size.

4. The method according to claim 1, wherein extracting the handwritten text from the text image according to the Convolutional Neural Network feature and the histogram of oriented gradient feature comprises:

determining a candidate handwritten text of the text image according to the Convolutional Neural Network feature and the histogram of oriented gradient feature;

identifying a semantic fluency of the candidate handwritten text;

on the condition that the semantic fluency is less than or equal to a preset threshold, correcting the candidate handwritten text according to a pre-trained error correction model so as to generate the handwritten text; and on the condition that the semantic fluency is greater than the preset threshold, taking the candidate handwritten text as the handwritten text.

5. A non-transitory computer readable storage medium, with computer instructions stored thereon, wherein the computer instructions are configured to cause a computer to execute the handwriting recognition method according to claim 1.

6. A computer program product, when instructions in the computer program product are executed by a processor, the handwriting recognition method according to claim 1 is implemented.

7. An electronic device, comprising:

at least one processor; and a memory in communication connection with the at least one processor; wherein the memory stores instructions executable by the at least one processor, and the instructions are executed by the at least one processor to enable the at least one processor to execute the operations comprise:

acquiring a text image containing handwritten text;

inputting the text image to a convolutional neural network and extracting a Convolutional Neural Network feature of the text image;

dividing the text image into a plurality of text subimages according to a preset size, and extracting directional gradient features of the plurality of text subimages;

acquiring a histogram of oriented gradient feature of the text image according to the directional gradient features; and extracting the handwritten text from the text image according to the Convolutional Neural Network feature and the histogram of oriented gradient feature;

wherein extracting the handwritten text from the text image according to the Convolutional Neural Network feature and the histogram of oriented gradient feature comprises:

generating a target image feature according to the Convolutional Neural Network feature and the histogram of oriented gradient feature and dividing the target image feature into a plurality of time steps;

encoding the target image feature by an encoding layer in a recognition model, so as to obtain an image encoding feature corresponding to each of the time steps in the target image feature;

sequentially inputting the image encoding feature corresponding to each of the time steps to a decoding layer in the recognition model for decoding, so as to obtain an image decoding feature corresponding to each of the time steps;

inputting the image decoding feature corresponding to each of the time steps to a classification layer in the recognition model, so as to obtain a handwritten text recognition result corresponding to each of the time steps; and recognizing the handwritten text according to the handwritten text recognition result;

wherein sequentially inputting the image encoding feature corresponding to each of the time steps to the decoding layer in the recognition model for decoding, so as to obtain an image decoding feature corresponding to each of the time steps comprises:

determining whether a currently input image encoding feature is a first image encoding feature;

on the condition that the currently input image encoding feature is not the first image encoding feature, acquiring an image decoding feature corresponding to a previously input image encoding feature;

generating an image decoding feature corresponding to the currently input image encoding feature according to the currently input image encoding feature and the image decoding feature corresponding to the previously input image encoding feature; and on the condition that the currently input image encoding feature is the first image encoding feature, acquiring a corresponding image decoding feature according to the currently input image encoding feature.

8. The electronic device according to claim 7, wherein the operation of acquiring the histogram of oriented gradient feature of the text image according to the directional gradient features comprises:

generating a plurality of subimage blocks according to the plurality of text subimages, wherein each of the plurality of subimage blocks contains a preset quantity of text subimages;

connecting the directional gradient features of all of the text subimages in each of the subimage blocks in series to obtain a histogram of oriented gradient subfeature corresponding to each of the subimage blocks; and acquiring the histogram of oriented gradient feature according to histogram of oriented gradient subfeatures corresponding to the plurality of subimage blocks.

9. The electronic device according to claim 7, wherein after the operation of acquiring the text images containing handwritten text, the operation further comprises:

acquiring a preset image size and adjusting a size of the text image to the preset image size.

10. The electronic device according to claim 7, wherein the operation of extracting the handwritten text from the text image according to the Convolutional Neural Network feature and the histogram of oriented gradient feature comprises:

determining a candidate handwritten text of the text image according to the Convolutional Neural Network feature and the histogram of oriented gradient feature;

identifying a semantic fluency of the candidate handwritten text;

on the condition that the semantic fluency is less than or equal to a preset threshold, correcting the candidate handwritten text according to a pre-trained error correction model so as to generate the handwritten text; and on the condition that the semantic fluency is greater than the preset threshold, taking the candidate handwritten text as the handwritten text.

* * * * *